United States Patent
Gorny et al.

(10) Patent No.: US 10,327,063 B1
(45) Date of Patent: Jun. 18, 2019

(54) SYSTEMS AND METHODS FOR MINIMIZING VIBRATION SENSITIVITY FOR PROTECTED MICROPHONES

(71) Applicant: GoPro, Inc., San Mateo, CA (US)

(72) Inventors: Joyce Gorny, Mountain View, CA (US); Erich Tisch, San Francisco, CA (US); Mark Hardin, Guerneville, CA (US); Per Magnus Fredrik Hansson, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/934,399

(22) Filed: Mar. 23, 2018

(51) Int. Cl.
| | |
|---|---|
| B06B 1/06 | (2006.01) |
| B06B 3/00 | (2006.01) |
| H04R 1/08 | (2006.01) |
| H04R 1/28 | (2006.01) |
| G02B 27/00 | (2006.01) |
| G03B 17/08 | (2006.01) |
| G03B 17/24 | (2006.01) |
| G03B 17/56 | (2006.01) |
| G03B 31/06 | (2006.01) |
| H04N 5/225 | (2006.01) |

(52) U.S. Cl.
CPC .......... *H04R 1/2876* (2013.01); *G03B 31/06* (2013.01); *H04R 1/08* (2013.01); *B06B 1/06* (2013.01); *B06B 3/00* (2013.01); *G02B 27/0006* (2013.01); *G03B 17/08* (2013.01); *G03B 17/24* (2013.01); *G03B 17/56* (2013.01); *G03B 2217/243* (2013.01); *G03B 2217/244* (2013.01); *G03B 2217/246* (2013.01); *H04N 5/2254* (2013.01); *H04N 5/22521* (2018.08)

(58) Field of Classification Search
CPC ...................................................... G03B 31/06
USPC ............................................................ 396/312
See application file for complete search history.

(56) References Cited

U.S. PATENT DOCUMENTS

| | | | | |
|---|---|---|---|---|
| 2,812,826 | A * | 11/1957 | Hawley .................... | H04R 1/38 181/242 |
| 5,288,955 | A * | 2/1994 | Staple ...................... | H04R 9/08 181/158 |
| 5,506,047 | A * | 4/1996 | Hedrick .................... | B32B 5/18 428/307.7 |
| 5,920,350 | A * | 7/1999 | Keirsbilck ........... | H04N 5/2251 348/374 |
| 6,831,984 | B2 * | 12/2004 | Sapiejewski ......... | H04R 1/2819 181/182 |

(Continued)

OTHER PUBLICATIONS

Shure, Handling Noise of Microphones, FAQ #2845, Feb. 2, 2012, 7 pgs.*

(Continued)

*Primary Examiner* — Clayton E. LaBalle
*Assistant Examiner* — Kevin C Butler
(74) *Attorney, Agent, or Firm* — Young Basile Hanlon & MacFarlane, P.C.

(57) ABSTRACT

Protected microphone systems may include one or more dampeners, one or more protective layers, or a combination thereof to minimize the vibration sensitivity of a microphone of the protected microphone systems. The dampeners, when present, may be constructed of a foam material or a thin metal material. The protective layer may be a membrane, a mesh, or any suitable material. The protective layer may be air permeable or non-air permeable.

20 Claims, 10 Drawing Sheets

(56) References Cited

U.S. PATENT DOCUMENTS

| | | | | |
|---|---|---|---|---|
| 7,499,555 B1* | 3/2009 | Isvan | | H04R 1/1075 |
| | | | | 381/182 |
| 8,103,013 B2* | 1/2012 | Sung | | G10K 11/178 |
| | | | | 381/71.7 |
| 8,111,858 B2* | 2/2012 | Sapiejewski | | H04R 1/1083 |
| | | | | 381/370 |
| 2008/0267431 A1* | 10/2008 | Leidl | | H04R 1/2838 |
| | | | | 381/173 |
| 2009/0279712 A1* | 11/2009 | Gollbach | | H04R 1/086 |
| | | | | 381/71.6 |
| 2010/0290662 A1* | 11/2010 | Song | | H04R 19/04 |
| | | | | 381/412 |
| 2011/0243350 A1* | 10/2011 | Miller | | H04R 19/016 |
| | | | | 381/111 |
| 2013/0177192 A1* | 7/2013 | Abry | | H04R 1/08 |
| | | | | 381/369 |
| 2014/0008740 A1* | 1/2014 | Wang | | B81C 1/00246 |
| | | | | 257/416 |
| 2014/0079260 A1* | 3/2014 | Kuster | | H04R 25/405 |
| | | | | 381/313 |
| 2014/0203380 A1* | 7/2014 | Theuss | | B81B 3/0021 |
| | | | | 257/416 |
| 2014/0339012 A1* | 11/2014 | Richardson | | G10K 11/18 |
| | | | | 181/202 |
| 2015/0139467 A1* | 5/2015 | Park | | H04R 1/04 |
| | | | | 381/355 |
| 2015/0304760 A1* | 10/2015 | Yeh | | H04R 1/1058 |
| | | | | 381/370 |
| 2015/0350775 A1* | 12/2015 | Behles | | H04R 3/002 |
| | | | | 381/354 |
| 2016/0037265 A1* | 2/2016 | Khenkin | | H04R 19/04 |
| | | | | 381/174 |
| 2016/0071506 A1* | 3/2016 | Qutub | | H04R 1/08 |
| | | | | 381/354 |
| 2017/0013352 A1* | 1/2017 | Shihuang | | H04R 1/283 |
| 2017/0064440 A1* | 3/2017 | Kim | | H04R 1/08 |
| 2017/0195776 A1* | 7/2017 | Reimert | | H04R 1/1008 |
| 2017/0245036 A1* | 8/2017 | Kuki | | C08J 7/00 |
| 2018/0091910 A1* | 3/2018 | Porter | | H04R 29/001 |
| 2018/0102123 A1* | 4/2018 | Tisch | | H04R 1/08 |

OTHER PUBLICATIONS

Microphone Technology:Nature of Response and Directional Characteristics, Posted on Feb. 1, 2016, 14 pages.*

Chris Wolf, Microphone Data Ltd, How to Reduce Wind Noise and Vibration, 2010 Microphone Data Ltd, 5 pages.*

Hyperphysics, Microphones, http://hyperphysics.phy-astr.gsu.edu/hbase/Audio/mic.html#c1, Aug. 24, 2018, 5 pages.*

* cited by examiner

SYSTEMS AND METHODS FOR MINIMIZING VIBRATION SENSITIVITY FOR PROTECTED MICROPHONES

TECHNICAL FIELD

This disclosure relates to vibration isolation in microphones.

BACKGROUND

Vibration of a device may cause energy to be detected by a microphone of an image capture device. This vibration may be detected as noise and cause degradation of the audio experience. Typical vibration isolation strategies employ dampeners to isolate microphone components. However, these strategies have been ineffective in protected microphone implementations.

SUMMARY

Disclosed herein are implementations of a system and method for minimizing vibration sensitivity for protected microphones. In examples where a microphone is protected by a membrane or a mesh, vibration noise may be dependent on the vibration of the protective membrane or mesh and the relative vibration of the microphone and membrane or mesh, in addition to the vibration sensitivity of the microphone component alone.

In one aspect, an image capture device may include a housing. The housing may include a first port that is fluidly connected to a first cavity of the image capture device and an external environment relative to the image capture device. The image capture device may include an audio capture device configured to obtain an audible sound and a printed circuit board (PCB) that may be electrically coupled to the audio capture device.

The PCB may include a second port that is fluidly connected to a second cavity and the audio capture device. A protective layer may separate the first cavity and the second cavity. The first cavity may be defined by a portion of the housing and a portion of the protective layer. The second cavity may be defined by a portion of the PCB and the portion of the protective layer. The PCB may be directly coupled to the housing.

The image capture device may include a support structure that is in contact with an edge portion of the protective layer. The support structure may be configured to provide structural support to the protective layer. The support structure may be adhered to a portion of the PCB and a portion of the housing.

The protective layer may be a mesh material or a membrane material. For example, the mesh material may be a polyester monofilament. The mesh material may have an acoustic resistance below 700 Rayls. It would be desirable to have a mesh material that is stiff, for which the transmission of sound is primarily through the pores of the mesh material. For example, the mesh material may have a stiffness of above $1\times10^6$ N/m. The membrane material may be a silicone material or a polytetrafluoroethylene (PTFE) material. It would be desirable to have a membrane material that has elasticity. For example, the membrane material may have a stiffness of 10 to 50 N/m. The membrane material may be air permeable or non-air permeable.

In another aspect, an image capture device may include a housing. The housing may include a first port that is fluidly connected to a first cavity of the image capture device and an external environment relative to the image capture device. The image capture device may include an audio capture device configured to obtain an audible sound and a PCB that may be electrically coupled to the audio capture device. The PCB may include a second port that is fluidly connected to a second cavity and the audio capture device.

In this example, the image capture device may include a dampener coupled to the PCB and the housing. In some examples, a portion of the dampener may also be coupled to the housing. The dampener may be a foam material or a thin metal. The image capture device may include a protective layer that separates the first cavity and the second cavity. The first cavity may be defined by a portion of the housing and a portion of the protective layer. The second cavity may be defined by a portion of the PCB and the portion of the protective layer.

The image capture device may include a support structure. The support structure may be in contact with an edge portion of the protective layer and configured to provide structural support to the protective layer. The support structure may be adhered to a portion of the dampener and a portion of the PCB.

The protective layer may be a mesh material or a membrane material. For example, the mesh material may be a polyester monofilament. The mesh material may have an acoustic resistance below 700 Rayls. It would be desirable to have a mesh material that is stiff, for which the transmission of sound is primarily through the pores of the mesh material. For example, the mesh material may have a stiffness of above $1\times10^6$ N/m. The membrane material may be a silicone material or a polytetrafluoroethylene (PTFE) material. It would be desirable to have a membrane material that has elasticity. For example, the membrane material may have a stiffness of 10 to 50 N/m. The membrane material may be air permeable or non-air permeable.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the embodiments disclosed herein, protected microphone systems may include dampeners, a protective layer, or a combination thereof to minimize the vibration sensitivity of a microphone of the protected microphone systems. The dampeners may be constructed of a foam material, a thin metal material, or any suitable material that is pliable and configured to absorb vibration energy. The protective layer may be a membrane, a mesh, or any suitable material. The protective layer may be air permeable or non-air permeable.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Figure 1:
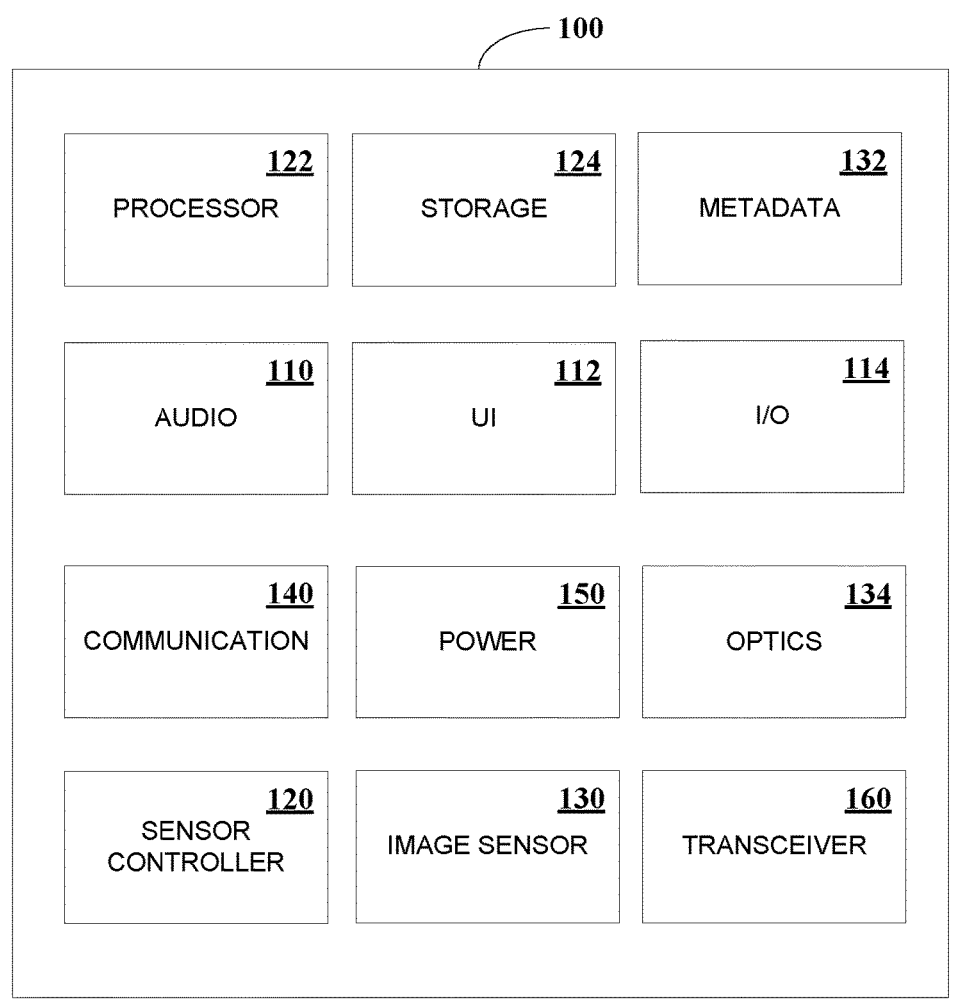
FIG. 1 is a diagram of an example of an image capture device.

FIG. 1 is a diagram of an example of an image capture device 100. In some implementations, an image capture device 100 may be an action camera that includes an audio component 112, an input/output (I/O) unit 114, a sensor controller 120, a processor 124, an image sensor 130, a metadata unit 132, an optics unit 134, a communication unit 140, a power system 150, or a combination thereof.

In some implementations, the audio component 110, which may include a microphone, may receive, sample, capture, record, or a combination thereof, audio information, such as sound waves. The audio information may be associated with, or stored in association with, image or video content contemporaneously captured by the image capture device 100. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 112 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 112 may include a display, one or more tactile elements (such as buttons and/or virtual touch screen buttons), lights (LEDs), speakers, and/or other user interface elements. The user interface unit 112 may receive user input and/or provide information to a user related to the operation of the image capture device 100.

In some implementations, the user interface unit 112 may include a display unit that presents information related to camera control or use, such as operation mode information, which may include image resolution information, frame rate information, capture mode information, sensor mode information, video mode information, photo mode information, or a combination thereof; connection status information, such as connected, wireless, wired, or a combination thereof; power mode information, such as standby mode information, sensor mode information, video mode information, or a combination thereof; information related to other information sources, such as heart rate information, global positioning system information, or a combination thereof; and/or other information.

In some implementations, the user interface unit 112 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 114 may synchronize the image capture device 100 with other cameras and/or with other external devices, such as a remote control, a second image capture device, a smartphone, a user interface device, and/or a video server. The I/O unit 114 may communicate information between I/O components. In some implementations, the I/O unit 114 may be connected to the communication unit 140 to provide a wired and/or wireless communications interface, such as a Wi-Fi interface, a Bluetooth interface, a USB interface, an HDMI interface, a Wireless USB interface, an NFC interface, an Ethernet interface, a radio frequency transceiver interface, and/or other interfaces, for communication with one or more external devices, such as a mobile device, or another metadata source. In some implementations, the I/O unit 114 may interface with LED lights, a display, a button, a microphone, speakers, and/or other I/O components. In some implementations, the I/O unit 114 may interface with an energy source, such as a battery, and/or a Direct Current (DC) electrical source.

In some implementations, the I/O unit 114 of the image capture device 100 may include one or more connections to external computerized devices for configuration and/or management of remote devices, as described herein. The I/O unit 114 may include any of the wireless or wireline interfaces described herein, and/or may include customized or proprietary connections for specific applications.

In some implementations, the sensor controller 120 may operate or control the image sensor 130, such as in response to input, such as user input. In some implementations, the sensor controller 120 may receive image and/or video input from the image sensor 130 and may receive audio information from the audio component 110.

In some implementations, the processor 122 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 100. In some implementations, the processor 122 may interface with the sensor controller 120 to obtain and process sensory information, such as for object detection, face tracking, stereo vision, and/or other image processing.

In some implementations, the sensor controller 120, the processor 122, or both may synchronize information received by the image capture device 100. For example, timing information may be associated with received sensor data, and metadata information may be related to content, such as images or videos, captured by the image sensor 130 based on the timing information. In some implementations, the metadata capture may be decoupled from video/image capture. For example, metadata may be stored before, after, and in-between the capture, processing, or storage of one or more video clips and/or images.

In some implementations, the sensor controller 120, the processor 122, or both may evaluate or process received metadata and may generate other metadata information. For example, the sensor controller 120 may integrate the received acceleration information to determine a velocity profile for the image capture device 100 concurrently with recording a video. In some implementations, video information may include multiple frames of pixels and may be encoded using an encoding method, such as H.264, H.265, CineForm, and/or other codecs.

Although not shown separately in FIG. 1, one or more of the audio component 110, the user interface unit 112, the I/O unit 114, the sensor controller 120, the processor 122, the electronic storage unit 124, the image sensor 130, the metadata unit 132, the optics unit 134, the communication unit 140, or the power systems 150 of the image capture device 100 may communicate information, power, or both with one or more other units, such as via an electronic communication pathway, such as a system bus. For example, the processor 122 may interface with the audio component 110, the user interface unit 112, the I/O unit 114, the sensor controller 120, the electronic storage unit 124, the image sensor 130, the metadata unit 132, the optics unit 134, the communication unit 140, or the power systems 150 via one or more driver interfaces and/or software abstraction layers. In some implementations, one or more of the units shown in FIG. 1 may include a dedicated processing unit, memory unit, or both (not shown). In some implementations, one or more components may be operable by one or more other control processes. For example, a global positioning system receiver may include a processing apparatus that may provide position and/or motion information to the processor 122 in accordance with a defined schedule, such as values of latitude, longitude, and elevation at 10 Hz.

In some implementations, the electronic storage unit 124 may include a system memory module that may store executable computer instructions that, when executed by the processor 122, perform various functionalities including those described herein. For example, the electronic storage unit 124 may be a non-transitory computer-readable storage medium, which may include executable instructions, and a processor, such as the processor 122, may execute an instruction to perform one or more, or portions of one or more, of the operations described herein. The electronic storage unit 124 may include storage memory for storing content, such as metadata, images, audio, or a combination thereof, captured by the image capture device 100.

In some implementations, the electronic storage unit 124 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 124 may include memory that may be used by other hardware/firmware/software elements of the image capture device 100.

In some implementations, the image sensor 130 may include one or more of a charge-coupled device sensor, an active pixel sensor, a complementary metal-oxide-semiconductor sensor, an N-type metal-oxide-semiconductor sensor, and/or another image sensor or combination of image sensors. In some implementations, the image sensor 130 may be controlled based on control signals from a sensor controller 120.

The image sensor 130 may sense or sample light waves gathered by the optics unit 134 and may produce image data or signals. The image sensor 130 may generate an output signal conveying visual information regarding the objects or other content corresponding to the light waves received by the optics unit 134. The visual information may include one or more of an image, a video, and/or other visual information.

In some implementations, the image sensor 130 may include a video sensor, an acoustic sensor, a capacitive sensor, a radio sensor, a vibrational sensor, an ultrasonic sensor, an infrared sensor, a radar sensor, a Light Detection and Ranging (LIDAR) sensor, a sonar sensor, or any other sensory unit or combination of sensory units capable of detecting or determining information in a computing environment.

In some implementations, the metadata unit 132 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 100 may contain one or more other sources of metadata information, telemetry, or both, such as image sensor parameters, battery monitor, storage parameters, and/or other information related to camera operation and/or capture of content. The metadata unit 132 may obtain information related to the environment of the image capture device 100 and aspects in which the content is captured.

For example, the metadata unit 132 may include an accelerometer that may provide device motion information, including velocity and/or acceleration vectors representative of motion of the image capture device 100. In another example, the metadata unit 132 may include a gyroscope that may provide orientation information describing the orientation of the image capture device 100. In another example, the metadata unit 132 may include a global positioning system sensor that may provide global positioning system coordinates, time, and information identifying a location of the image capture device 100. In another example, the metadata unit 132 may include an altimeter that may obtain information indicating an altitude of the image capture device 100.

In some implementations, the metadata unit 132, or one or more portions thereof, may be rigidly coupled to the image capture device 100, such that motion, changes in orientation, or changes in the location of the image capture device 100 may be accurately detected by the metadata unit 132. Although shown as a single unit, the metadata unit 132, or one or more portions thereof, may be implemented as multiple distinct units. For example, the metadata unit 132 may include a temperature sensor as a first physical unit and a global positioning system unit as a second physical unit. In some implementations, the metadata unit 132, or one or more portions thereof, may be included in an image capture device 100 as shown or may be included in a physically separate unit operatively coupled to, such as in communication with, the image capture device 100.

In some implementations, the optics unit 134 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations, the optics unit 134 may include a focus controller unit that may control the operation and configuration of the camera lens. The optics unit 134 may receive light from an object and may focus received light onto an image sensor 130. Although not shown separately in FIG. 1, in some implementations, the optics unit 134 and the image sensor 130 may be combined, such as in a combined physical unit, for example, a housing.

In some implementations, the communication unit 140 may be coupled to the I/O unit 114 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular Long Term Evolution (LTE), communications interface for communication between the image capture device 100 and a remote device, such as a mobile device. The communication unit 140 may communicate using, for example, Ethernet, 802.11, worldwide interoperability for microwave access (WiMAX), Third Generation Partnership Project (3GPP), LTE, digital subscriber line (DSL), asynchronous transfer mode (ATM), InfiniBand, PCI Express Advanced Switching, and/or other communication technologies. In some implementations, the communication unit 140 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 140 may be represented using formats including one or more of hypertext markup language (HTML), extensible markup language (XML), and/or other formats. One or more exchanges of information between the image capture device 100 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 150 supply power to the image capture device 100. For example, for a small-sized, lower-power action camera, a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 100. Multiple mechanical, sensory, or electrical units may be controlled by a learning apparatus via network/radio connectivity.

Figure 2:
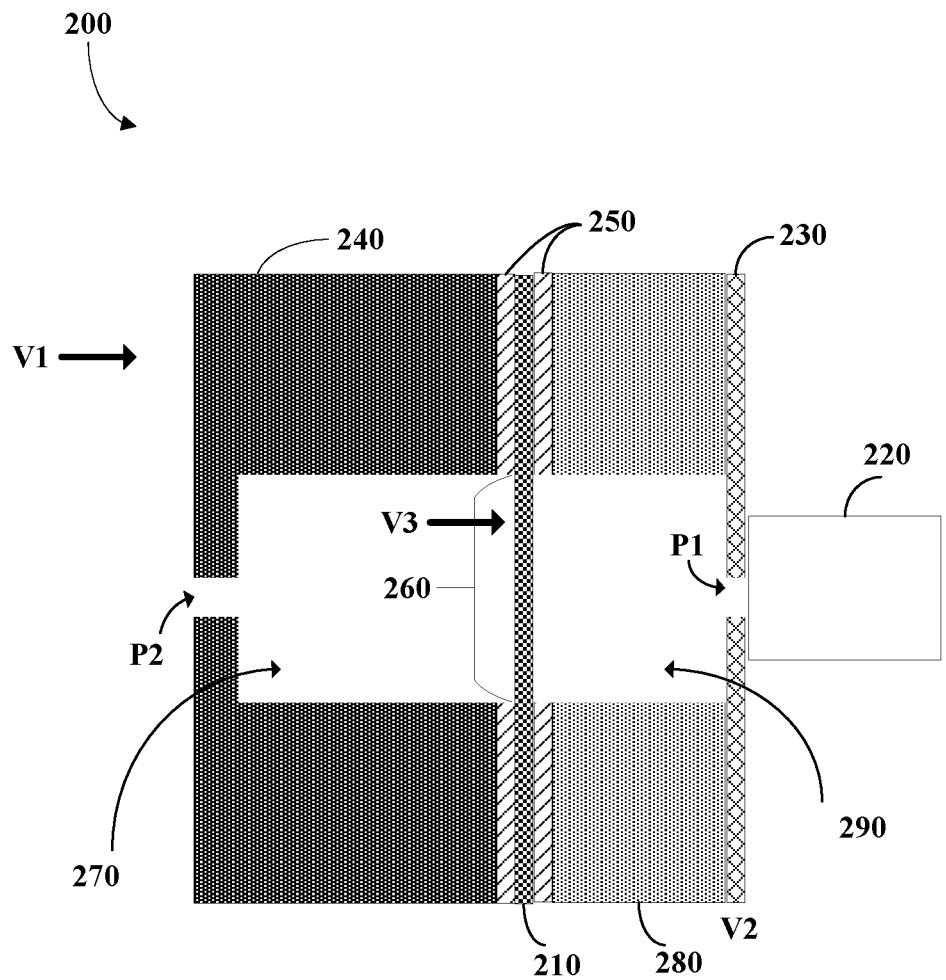
FIG. 2 is a diagram of an example of a protected microphone system with a membrane protective layer.

FIG. 2 is a diagram of an example of a protected microphone system 200 with a membrane protective layer 210. In this example, the membrane protective layer 210 may be silicone, polytetrafluoroethylene (PTFE), or any suitable material, and it may be air permeable or non-air permeable. The protected microphone system 200 includes a microphone 220, a printed circuit board (PCB) 230, and a housing 240. The PCB 230 may be flexible or rigid, and is electrically coupled to the microphone 220. The PCB 230 includes a port P1 to allow sound to travel to the microphone 220.

The housing 240 includes a port P2 to allow sound to travel into the protected microphone system 200. In this example, the membrane protective layer 210 is adhered to the housing 240 using support structures 250. The membrane protective layer 210 includes an active area 260. The active area 260, along with a portion of the housing 240 and a portion of the support structures 250 form a cavity 270 within the protected microphone system 200. In this example, dampeners 280 are included between the PCB 230 and the membrane protective layer 210, and the membrane protective layer 210 is adhered to the dampeners 280 using support structures 250. The dampeners 280 may be a foam, thin metal, or any suitable material. The active area 260, along with a portion of the dampeners 280, a portion of the PCB 230, and a portion of the support structures 250 form a cavity 290 within the protective microphone system 200. As shown in FIG. 2, the cavity 270 and the cavity 290 are separated by the active area 260 of the membrane protective layer 210. In this example, a first velocity (V1) represents the motion of the housing 240 and support structure 250, a second velocity (V2) represents the motion of the PCB 230 and the microphone 220, and a third velocity (V3) represents the motion of the active area 260. V1 is a forcing velocity on the housing 240. For example, V1 may be the velocity of handlebars to which the image capture device is mounted. V1 may not be dependent on the parameters of the dampeners 280, membrane protective layer 210, support structures 250, or a combination of any of the above. The velocity difference between V1 and V2 may be based on the elasticity of the dampeners 280.

V2 and V3 may vary based on the stiffness of the dampeners 280, the mass of the microphone 220 and PCB 230 structure, the stiffness of the membrane protective layer 210, the mass of the membrane protective layer 210, or a combination of any of the above. The dampeners 280 may have a stiffness above approximately $1 \times 10^6$ N/m. In some examples, a stiffness below $1 \times 10^6$ N/m may result in a significant impact on microphone performance. The membrane protective layer 210 may have a stiffness ranging from 10 to 50 N/m. The membrane protective layer 210 may have a mass that is below approximately $2 \times 10^{-5}$ kg. An example where the membrane protective layer 210 has a mass that is above $2 \times 10^{-5}$ kg may result in poor microphone performance as the resonance moves too far into the audible frequency range. These parameters, for example dampener stiffness, microphone and PCB mass, membrane stiffness, and membrane mass, may each vary with the dimensions of cavity 270, cavity 290, P1, and P2.

Figure 3:
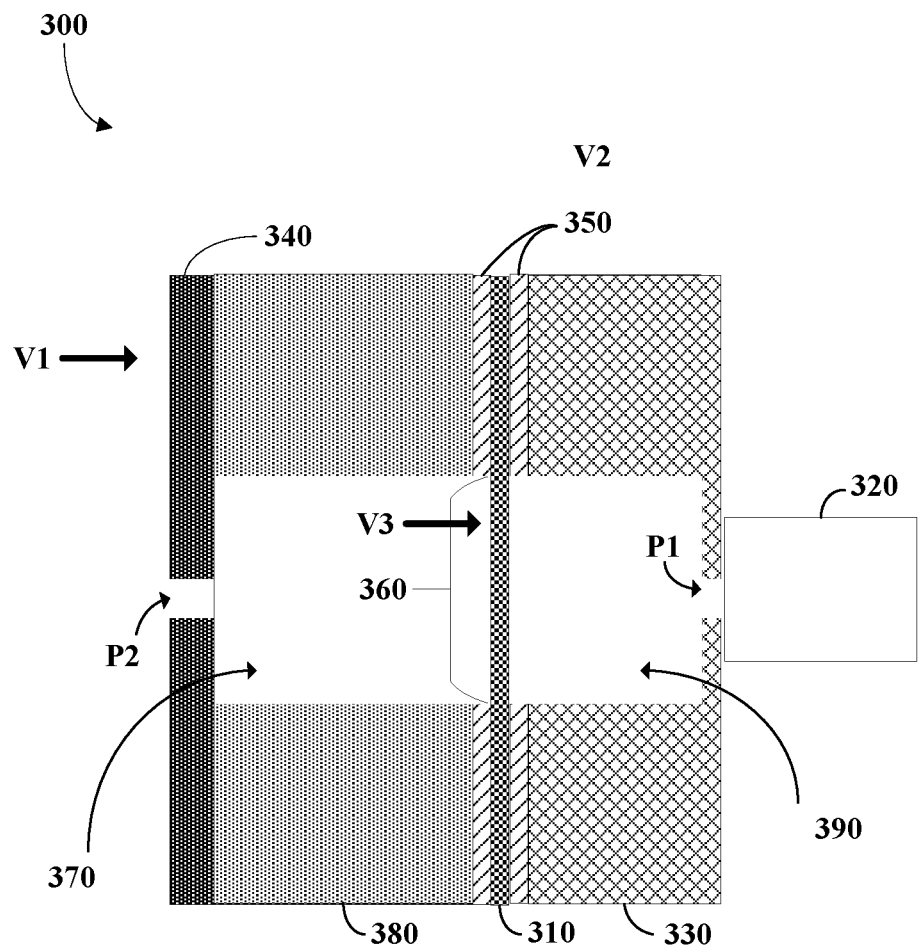
FIG. 3 is a diagram of another example of a protected microphone system with a membrane protective layer.

FIG. 3 is a diagram of another example of a protected microphone system 300 with a membrane protective layer 310. In this example, the membrane protective layer 310 may be silicone, PTFE, or any suitable material, and it may be air permeable or non-air permeable. The protected microphone system 300 includes a microphone 320, a PCB 330, and a housing 340. The PCB 330 may be flexible or rigid, and is electrically coupled to the microphone 320. The PCB 330 includes a port P1 to allow sound to travel to the microphone 320.

The housing 340 includes a port P2 to allow sound to travel into the protected microphone system 300. In this example, the membrane protective layer 310 is adhered to the PCB 330 using support structures 350. The membrane protective layer 310 includes an active area 360. In this example, dampeners 380 are included between the PCB 330 and the membrane protective layer 310, and the membrane protective layer 310 is adhered to the dampeners 380 using support structures 350. The dampeners 380 may be a foam, thin metal, or any suitable material. The active area 360, along with a portion of the housing 340, a portion of the support structures 350, and a portion of the dampeners 380 form a cavity 370 within the protected microphone system 300. The active area 360, along with a portion of the PCB 230, and a portion of the support structures 350 form a cavity 390 within the protective microphone system 300. As shown in FIG. 3, the cavity 370 and the cavity 390 are separated by the active area 360 of the membrane protective layer 310. In this example, a first velocity (V1) represents the motion of the housing 340, a second velocity (V2) represents the motion of the PCB 330 and the membrane support structure 350, and a third velocity (V3) represents the motion of the active area 360.

V2 and V3 may vary based on the stiffness of the dampeners 380, the mass of the microphone 220 and PCB 230 structure, the stiffness of the membrane protective layer 310, the mass of the membrane protective layer 310, or a combination of any of the above. In this example, the stiffness of the dampeners 380 may have a reduced effect on the microphone performance when compared to the example in FIG. 2. The dampeners 380 may have a stiffness above approximately $1 \times 10^7$ N/m. In some examples, a stiffness below $1 \times 10^7$ N/m may result in a significant impact on microphone performance. In this example, changing the stiffness of the membrane protective layer 310 may not change the relationship between the acoustic and vibration sensitivities when compared to the example in FIG. 2. The membrane protective layer 310 may have a stiffness ranging from 10 to 100 N/m in this example to produce acceptable acoustic sensitivity. The membrane protective layer 310 may have a mass that is below approximately $2 \times 10^{-5}$ kg. An example where the membrane protective layer 310 has a mass that is above $2 \times 10^{-5}$ kg may result in poor microphone performance as the resonance moves too far into the audible frequency range. An example where the membrane protective layer 310 has a mass that is below $2 \times 10^{-6}$ kg may result in low vibration sensitivity on a condition that the dampener 380 meet the minimum threshold of stiffness of $1 \times 10^7$ N/m. These parameters, for example dampener stiffness, microphone and PCB mass, membrane stiffness, and membrane mass, may each vary with the dimensions of cavity 370, cavity 390, P1, and P2.

Figure 4:
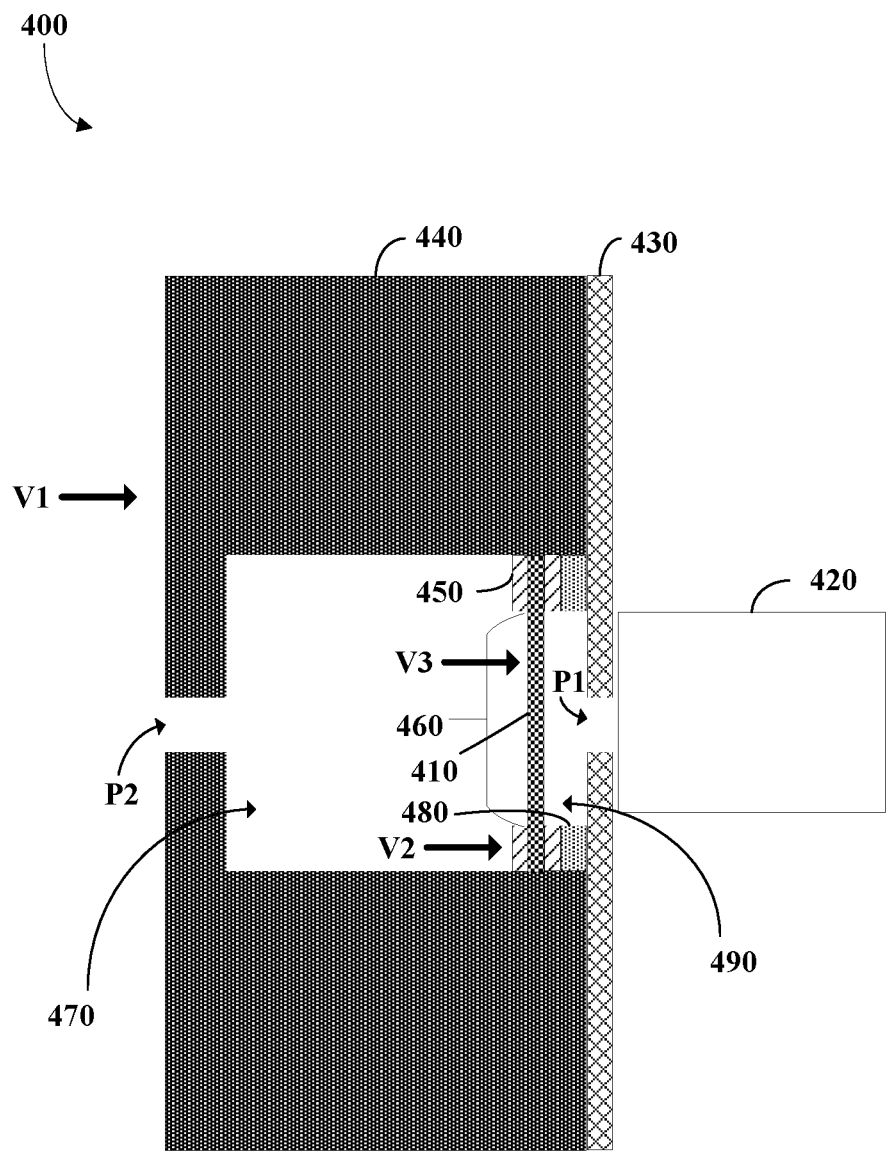
FIG. 4 is a diagram of an example of a protected microphone system with a mesh protective layer.

FIG. 4 is a diagram of an example of a protected microphone system 400 with a mesh protective layer 410. In this example, the mesh protective layer 410 may be polyester monofilament or any suitable material. The protected microphone system 400 includes a microphone 420, a PCB 430, and a housing 440. The PCB 430 may be flexible or rigid, and is electrically coupled to the microphone 420. In this example, the PCB 430 is coupled to the housing 440. The PCB 430 includes a port P1 to allow sound to travel to the microphone 420.

The housing 440 includes a port P2 to allow sound to travel into the protected microphone system 400. In this example, the mesh protective layer 410 is adhered to the housing 440 using support structures 450. The mesh protective layer 410 includes an active area 460. The active area 460, along with a portion of the housing 440 and a portion of the support structures 450 form a cavity 470 within the protected microphone system 400. In this example, dampeners 480 are included between the PCB 430 and the mesh protective layer 410, and the mesh protective layer 410 is adhered to the dampeners 480 using support structures 450. The dampeners 480 may be a foam, thin metal, or any suitable material. The active area 460, along with a portion of the dampeners 480, a portion of the PCB 430, and a portion of the support structures 450 form a cavity 490 within the protective microphone system 400. As shown in FIG. 4, the cavity 470 and the cavity 490 are separated by the active area 460 of the mesh protective layer 410. In this example, a first velocity (V1) represents the motion of the housing 440 and PCB 430, a second velocity (V2) represents the motion of the support structure 450, and a third velocity (V3) represents the motion of the active area 460.

V2 and V3 may vary based on the stiffness of the dampeners 480, the mass of the microphone 220 and PCB 230 structure, the stiffness of the mesh protective layer 410, the mass of the mesh protective layer 410, the acoustic resistance of the mesh protective layer 410 or a combination of any of the above. The dampeners 480 may have a stiffness above approximately $1 \times 10^6$ N/m. In some examples, a stiffness below $1 \times 10^6$ N/m may result in a significant impact on microphone performance. These parameters, for example dampener stiffness, microphone and PCB mass, mesh stiffness, mesh mass, and mesh acoustic resistance, may each vary with the dimensions of cavity 470, cavity 490, P1, and P2.

Figure 5:
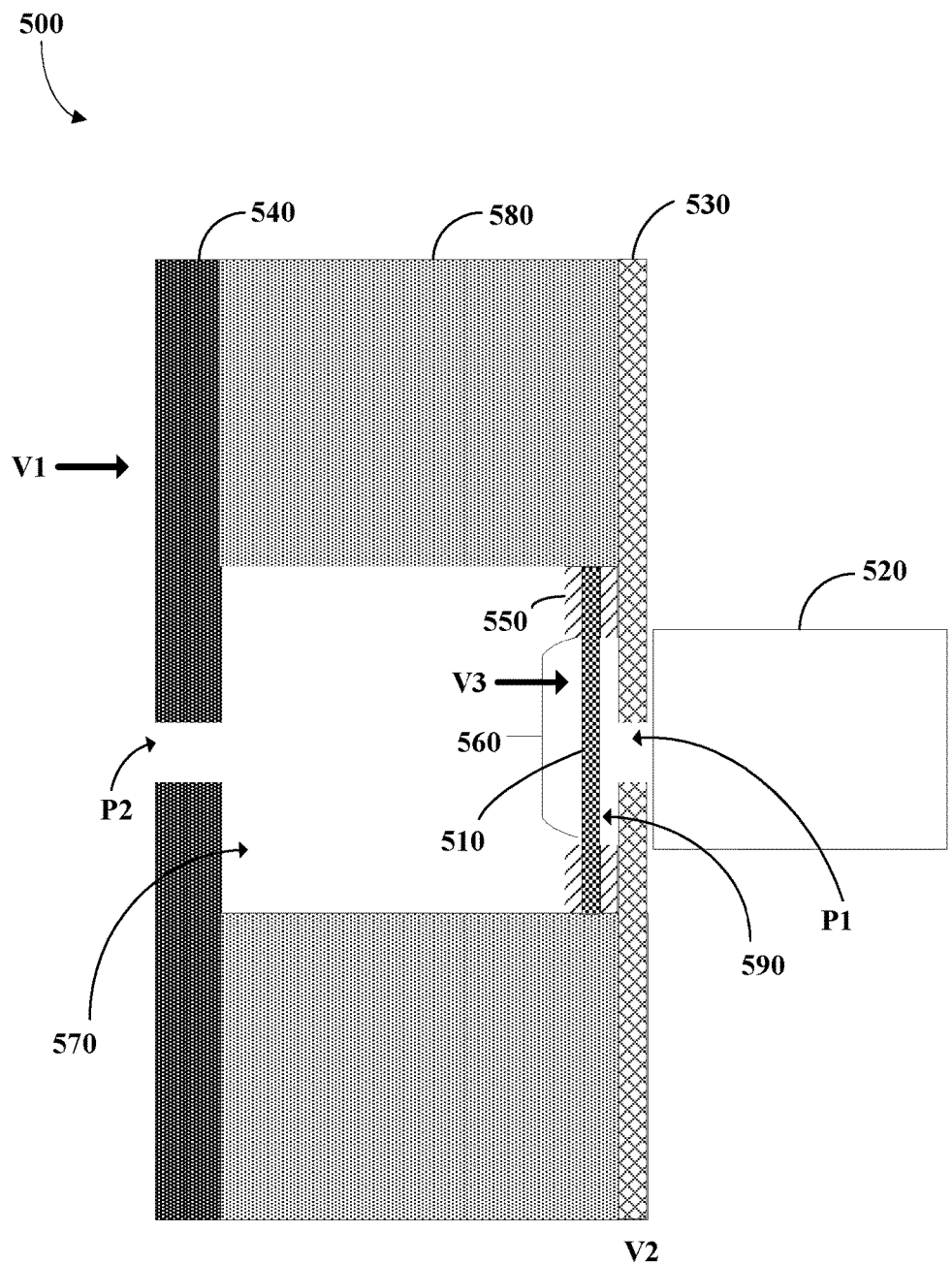
FIG. 5 is a diagram of another example of a protected microphone system with a mesh protective layer.

FIG. 5 is a diagram of another example of a protected microphone system 500 with a mesh protective layer 510. In this example, the mesh protective layer 510 may be polyester monofilament or any suitable material. The protected microphone system 500 includes a microphone 520, a PCB 530, and a housing 540. The PCB 530 may be flexible or rigid, and is electrically coupled to the microphone 520. In this example, dampeners 580 are coupled to the PCB 530 the housing 540. The PCB 530 includes a port P1 to allow sound to travel to the microphone 520.

The housing 540 includes a port P2 to allow sound to travel into the protected microphone system 500. In this example, the mesh protective layer 510 is adhered to the PCB 530 using support structures 550. The mesh protective layer 510 includes an active area 560. The active area 560, along with a portion of the housing 540, a portion of the dampeners 580, and a portion of the support structures 550 form a cavity 570 within the protected microphone system 500. In this example, the mesh protective layer 510 is adhered to the PCB 530 using support structures 550. The dampeners 580 may be a foam, thin metal, or any suitable material. The active area 560, along with a portion of the PCB 530 and a portion of the support structures 550 form a cavity 590 within the protective microphone system 500. In this example, the volume of cavity 590 is kept to a minimum by adhering the mesh protective layer 510 directly to the PCB 530 using support structures 550. As shown in FIG. 5, the cavity 570 and the cavity 590 are separated by the active area 560 of the mesh protective layer 510. In this example, a first velocity (V1) represents the motion of the housing 540, a second velocity (V2) represents the motion of the PCB 530 and support structure 550, and a third velocity (V3) represents the motion of the active area 560.

V2 and V3 may vary based on the stiffness of the dampeners 580, the mass of the microphone 220 and PCB 230 structure, the stiffness of the mesh protective layer 510, the mass of the mesh protective layer 510, the acoustic resistance of the mesh protective layer 510, or a combination of any of the above. The dampeners 580 may have a stiffness above approximately $1 \times 10^6$ N/m. In some examples, a stiffness below $1 \times 10^6$ N/m may result in a significant impact on microphone performance. In this example, an acoustic resistance of the mesh protective layer 510 of below 700 Rayls (kg/sm$^2$) produce a minimal impact on the acoustic sensitivity and low vibration sensitivity. The mesh protective layer 510 may have a stiffness of over approximately $1 \times 10^6$ N/m and may have a low vibration sensitivity. These parameters, for example dampener stiffness, microphone and PCB mass, mesh stiffness, mesh mass, and acoustic resistance, may each vary with the dimensions of cavity 570, cavity 590, P1, and P2.

Figure 6:
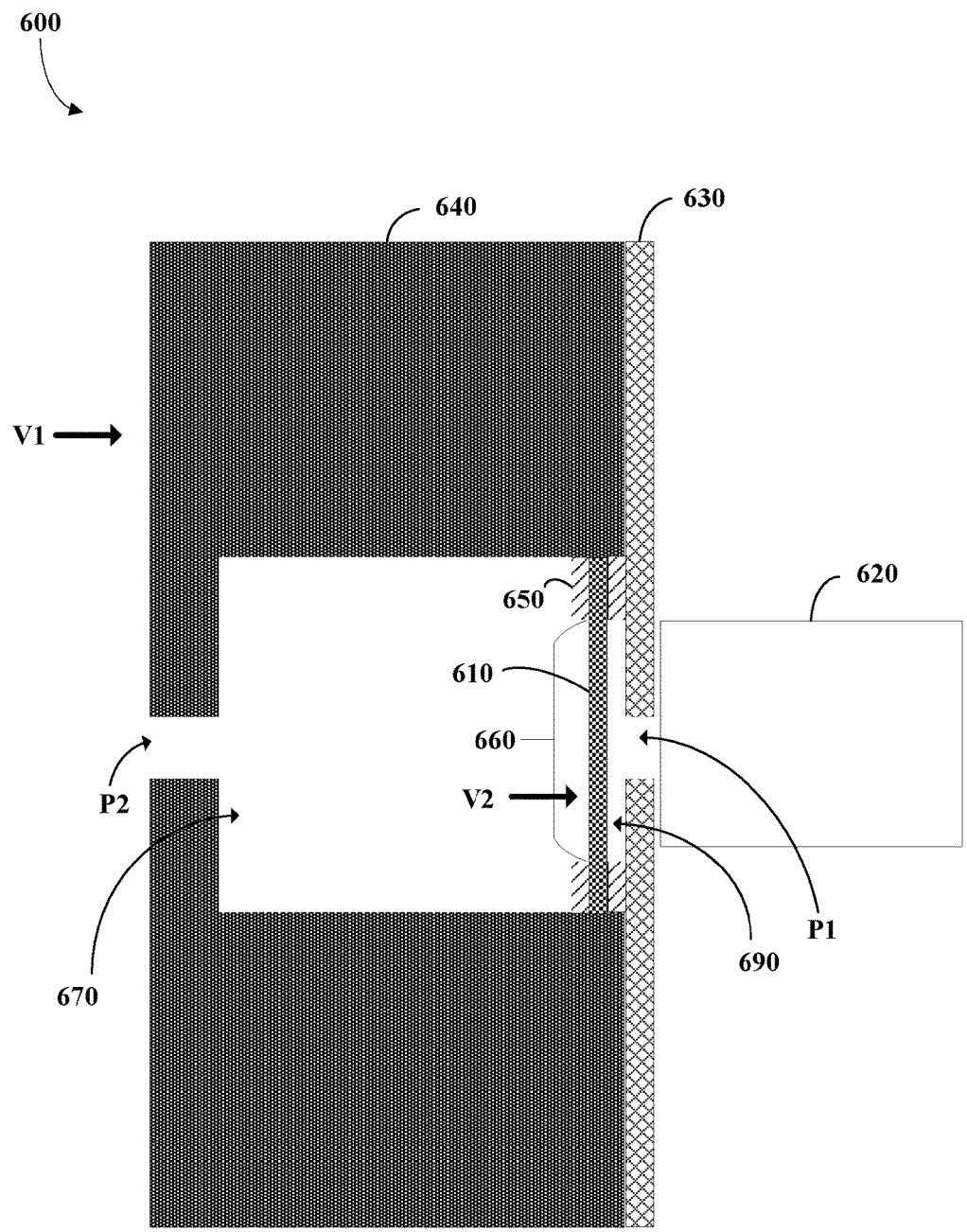
FIG. 6 is a diagram of another example of a protected microphone system with a mesh protective layer.

FIG. 6 is a diagram of another example of a protected microphone system 600 with a mesh protective layer 610. In this example, the mesh protective layer 610 may be polyester monofilament or any suitable material. The protected microphone system 600 includes a microphone 620, a PCB 630, and a housing 640. The PCB 630 may be flexible or rigid, and is electrically coupled to the microphone 620. In this example, the PCB 630 is coupled to the housing 640. The PCB 630 includes a port P1 to allow sound to travel to the microphone 620.

The housing 640 includes a port P2 to allow sound to travel into the protected microphone system 600. In this example, the mesh protective layer 610 is adhered to the PCB 630 using support structures 650. The mesh protective layer 610 includes an active area 660. The active area 660, along with a portion of the housing 640 and a portion of the support structures 650 form a cavity 670 within the protected microphone system 600. In this example, the mesh protective layer 610 is adhered to the PCB 630 using support structures 650. The active area 660, along with a portion of the PCB 630 and a portion of the support structures 650 form a cavity 690 within the protective microphone system 600. In this example, the volume of cavity 690 is kept to a minimum by adhering the mesh protective layer 610 directly to the PCB 630 using support structures 650. As shown in FIG. 6, the cavity 670 and the cavity 690 are separated by the active area 660 of the mesh protective layer 610. In this example, a first velocity (V1) represents the motion of the housing 640, PCB 630, and support structure 650 and a second velocity (V2) represents the motion of the active area 660.

V2 may vary based on the stiffness of the mesh protective layer 610, the mass of the mesh protective layer 610, the acoustic resistance of the mesh protective layer 610, or a combination of any of the above. In this example, an acoustic resistance of the mesh protective layer 610 of below 700 Rayls (kg/sm$^2$) produced a minimal impact on the acoustic sensitivity and low vibration sensitivity. Unexpectedly, the system without dampening material yields the lowest vibration sensitivity relative to acoustic sensitivity. The mesh protective layer 610 may have a stiffness of over approximately $1 \times 10^6$ N/m and may have a low vibration sensitivity. These parameters, for example mesh stiffness and acoustic resistance, may each vary with the dimensions of cavity 670, cavity 690, P1, and P2.

Figure 7:
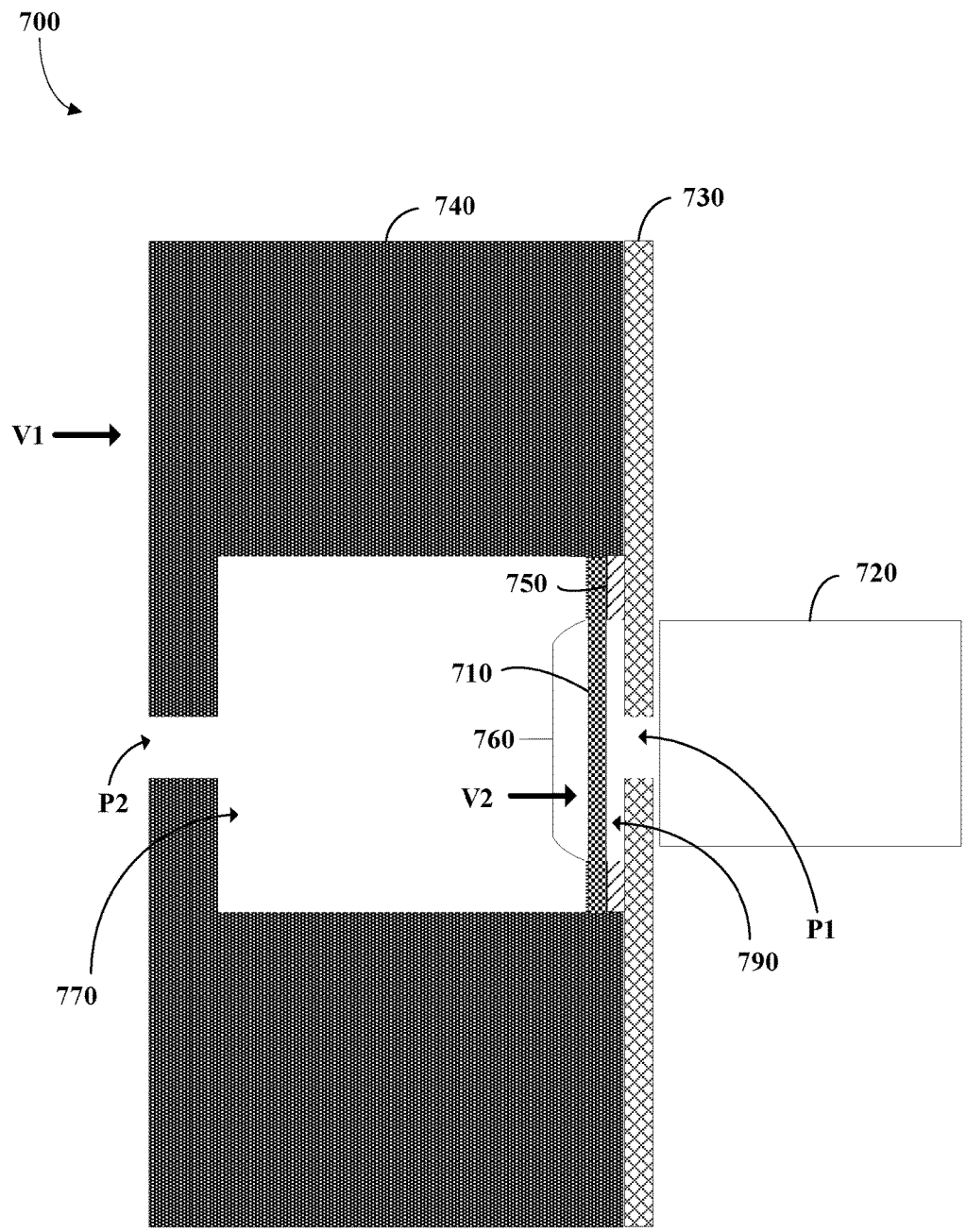
FIG. 7 is a diagram of another example of a protected microphone system with a mesh protective layer.

FIG. 7 is a diagram of another example of a protected microphone system 700 with a mesh protective layer 710. In this example, the mesh protective layer 710 may be polyester monofilament or any suitable material. The protected microphone system 700 includes a microphone 720, a PCB 730, and a housing 740. The PCB 730 may be flexible or rigid, and is electrically coupled to the microphone 720. In this example, the PCB 730 is coupled to the housing 740. The PCB 730 includes a port P1 to allow sound to travel to the microphone 720.

The housing 740 includes a port P2 to allow sound to travel into the protected microphone system 700. In this example, the mesh protective layer 710 is adhered to the PCB 730 using support structures 750. The mesh protective layer 710 includes an active area 760. In this example, since the support structures 750 are included on a single side of the mesh protective layer 710, the mesh protective layer 710 along with a portion of the housing 740 form a cavity 770 within the protected microphone system 700. In this example, the mesh protective layer 710 is adhered to the housing 740 using support structures 750. The active area 760, along with a portion of the PCB 730 and a portion of the support structures 750 form a cavity 790 within the protective microphone system 700. In this example, the volume of cavity 790 is kept to a minimum by adhering the mesh protective layer 710 directly to the PCB 730 using support structures 750. As shown in FIG. 7, the cavity 770 and the cavity 790 are separated by the active area 760 of the mesh protective layer 710. In this example, a first velocity (V1) represents the motion of the housing 740, the PCB 730, and the support structure 750, and a second velocity (V2) represents the motion of the active area 760.

V2 may vary based on the stiffness of the mesh protective layer 710, the mass of the mesh protective layer 710, the acoustic resistance of the mesh protective layer 710, or a combination of any of the above. In this example, an acoustic resistance of the mesh protective layer 710 of below 700 Rayls (kg/sm$^2$) produced a minimal impact on the acoustic sensitivity and low vibration sensitivity. Unexpectedly, the system without dampening material yields the lowest vibration sensitivity relative to acoustic sensitivity. The mesh protective layer 710 may have a stiffness of over approximately $1 \times 10^6$ N/m and may have a low vibration sensitivity. These parameters, for example mesh stiffness, mass, and acoustic resistance, may each vary with the dimensions of cavity 770, cavity 790, P1, and P2.

Figure 8:
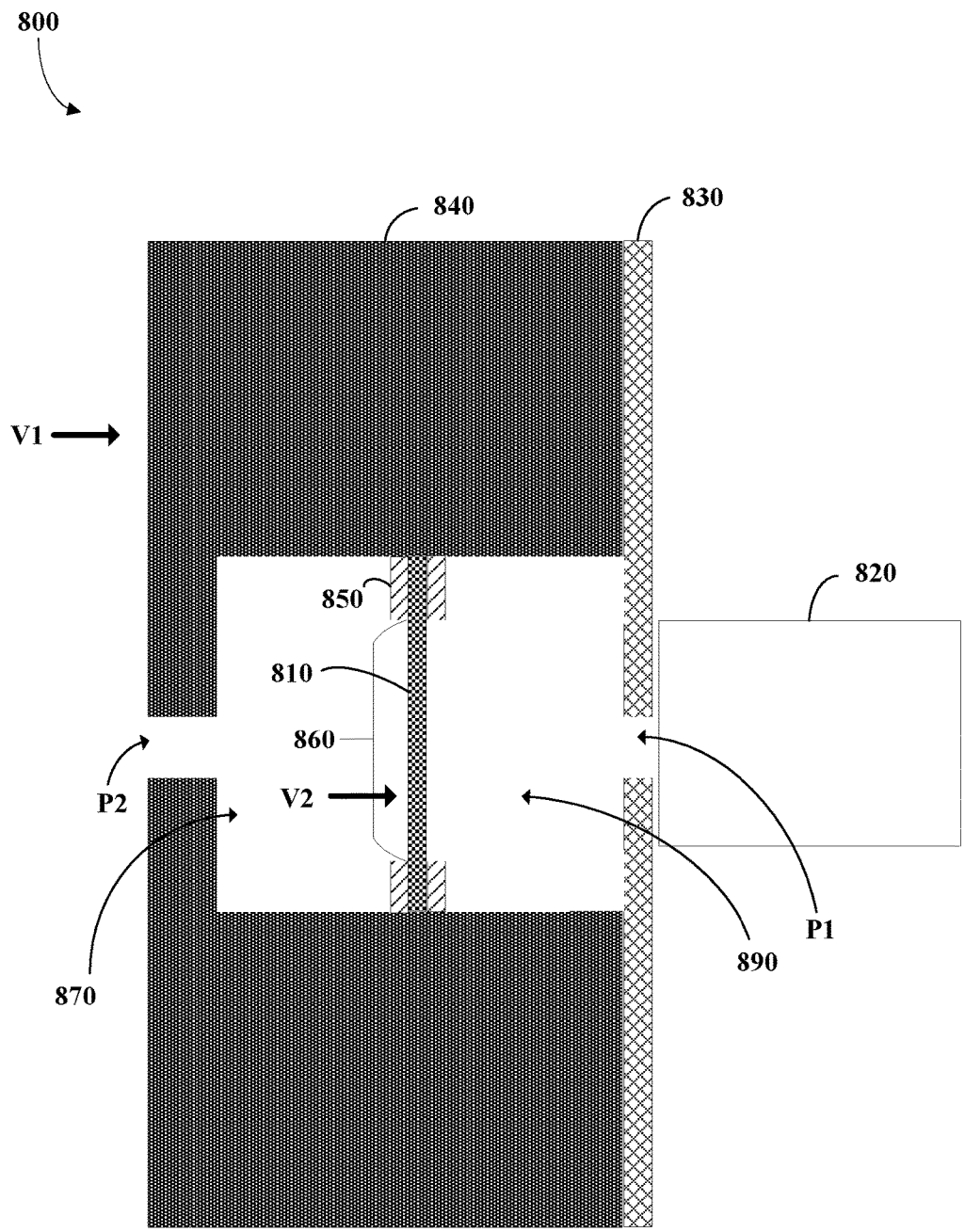
FIG. 8 is a diagram of another example of a protected microphone system with a mesh protective layer.

FIG. 8 is a diagram of another example of a protected microphone system 800 with a mesh protective layer 810. In this example, the mesh protective layer 810 may be polyester monofilament or any suitable material. The protected microphone system 800 includes a microphone 820, a PCB 830, and a housing 840. The PCB 830 may be flexible or rigid, and is electrically coupled to the microphone 820. In this example, the PCB 830 is coupled to the housing 840. The PCB 830 includes a port P1 to allow sound to travel to the microphone 820.

The housing 840 includes a port P2 to allow sound to travel into the protected microphone system 800. In this example, the mesh protective layer 810 is adhered to the housing 840 using support structures 850. The mesh protective layer 810 includes an active area 860. The active area 860, along with a portion of the housing 840 and a portion of the support structures 850 form a cavity 870 within the protected microphone system 800. The active area 860, along with a portion of the PCB 830 and a portion of the support structures 850 form a cavity 890 within the protective microphone system 800. In this example, the volume of cavity 870 and cavity 890 are substantially similar. As shown in FIG. 8, the cavity 870 and the cavity 890 are separated by the active area 860 of the mesh protective layer 810. In this example, a first velocity (V1) represents the motion of the housing 840, the PCB 830, and the support structure 850, and a second velocity (V2) represents the motion of the active area 860.

V2 may vary based on the stiffness of the mesh protective layer 810, the mass of the mesh protective layer 810, the acoustic resistance of the mesh protective layer 810, or a combination of any of the above. In this example, an acoustic resistance of the mesh protective layer 810 of below 700 Rayls (kg/sm$^2$) produced a minimal impact on the acoustic sensitivity and low vibration sensitivity. Unexpectedly, the system without dampening material yields the lowest vibration sensitivity relative to acoustic sensitivity. The mesh protective layer 810 may have a stiffness of over approximately 1×10$^6$ N/m and may have a low vibration sensitivity. These parameters, for example mesh stiffness, mass, and acoustic resistance, may each vary with the dimensions of cavity 870, cavity 890, P1, and P2.

Figure 9:
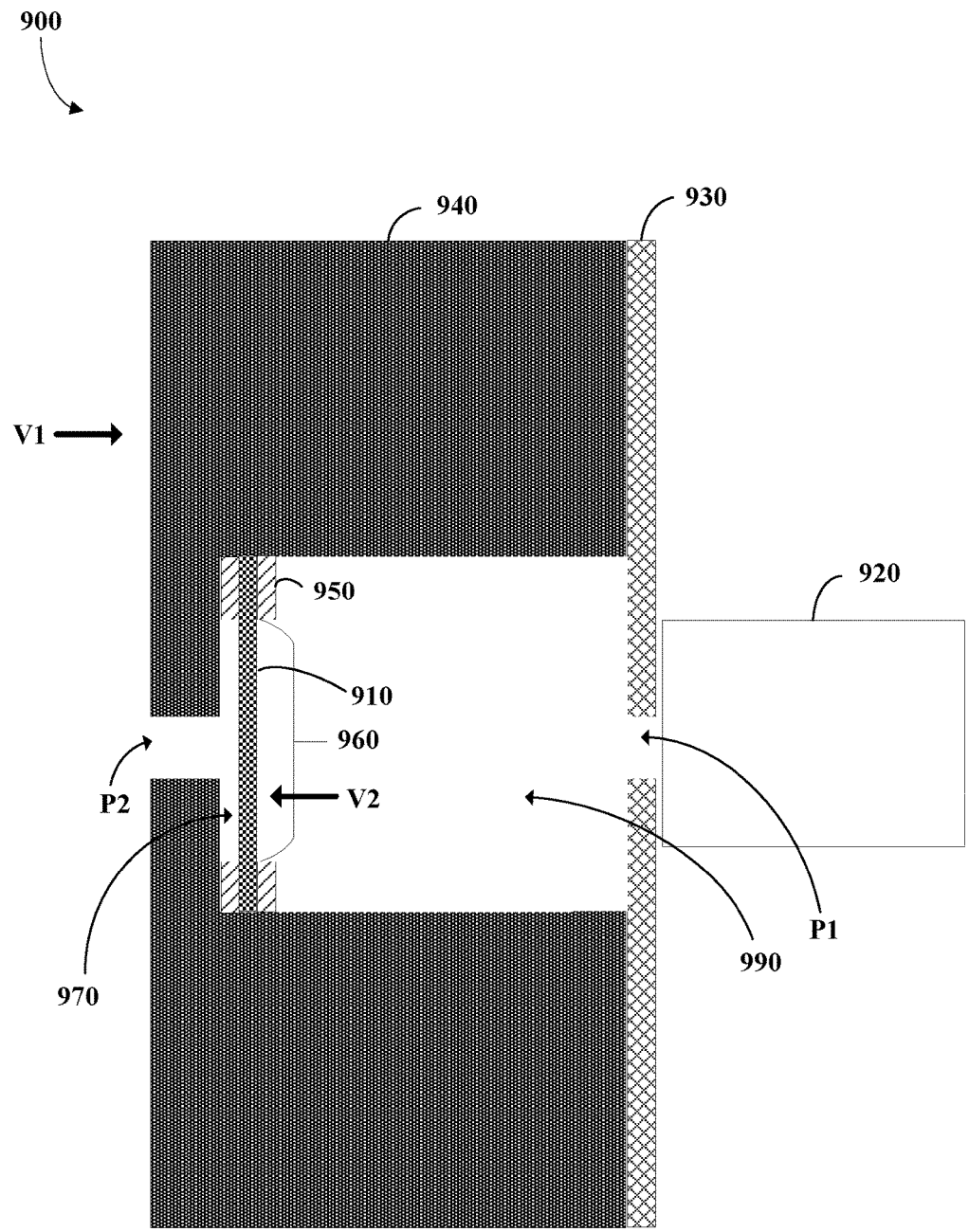
FIG. 9 is a diagram of another example of a protected microphone system with a mesh protective layer.

FIG. 9 is a diagram of another example of a protected microphone system 900 with a mesh protective layer 910. In this example, the mesh protective layer 910 may be polyester monofilament or any suitable material. The protected microphone system 900 includes a microphone 920, a PCB 930, and a housing 940. The PCB 930 may be flexible or rigid, and is electrically coupled to the microphone 920. In this example, the PCB 930 is coupled to the housing 940. The PCB 930 includes a port P1 to allow sound to travel to the microphone 920.

The housing 940 includes a port P2 to allow sound to travel into the protected microphone system 900. In this example, the mesh protective layer 910 is adhered to the housing 940 using support structures 950. The mesh protective layer 910 includes an active area 960. The active area 960, along with a portion of the housing 940 and a portion of the support structures 950 form a cavity 970 within the protected microphone system 900. The active area 960, along with a portion of the PCB 930 and a portion of the support structures 950 form a cavity 990 within the protective microphone system 900. In this example, the volume of cavity 970 is kept to a minimum by adhering the mesh protective layer 910 directly to a portion of the housing 940 closest to port P2 using support structures 950. As shown in FIG. 9, the cavity 970 and the cavity 990 are separated by the active area 960 of the mesh protective layer 910. In this example, a first velocity (V1) represents the motion of the housing 940, the PCB 930, and the support structure 950, and a second velocity (V2) represents the motion of the active area 960.

V2 may vary based on the stiffness of the mesh protective layer 910, the mass of the mesh protective layer 910, the acoustic resistance of the mesh protective layer 610, or a combination of any of the above. In this example, an acoustic resistance of the mesh protective layer 910 of below 700 Rayls (kg/sm$^2$) produced a minimal impact on the acoustic sensitivity and low vibration sensitivity. Unexpectedly, the system without dampening material yields the lowest vibration sensitivity relative to acoustic sensitivity. The mesh protective layer 910 may have a stiffness of over approximately 1×10$^6$ N/m and may have a low vibration sensitivity. These parameters, for example mesh stiffness, mass, and acoustic resistance, may each vary with the dimensions of cavity 970, cavity 990, P1, and P2.

Figure 10:
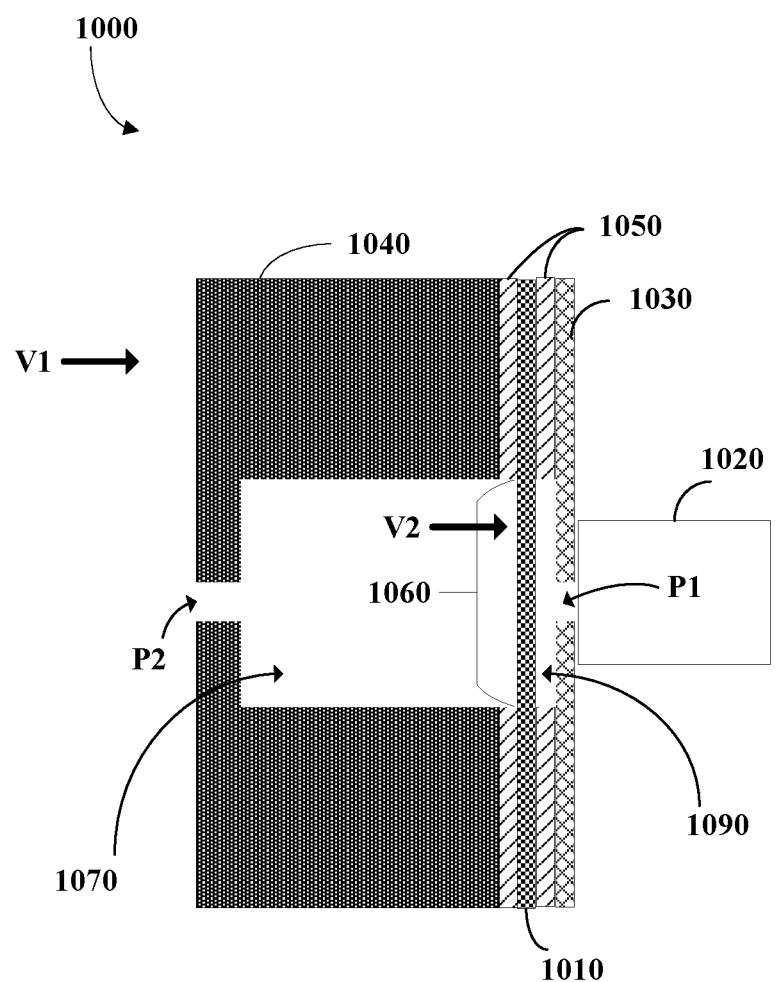
FIG. 10 is a diagram of another example of a protected microphone system with a mesh protective layer.

FIG. 10 is a diagram of another example of a protected microphone system 1000 with a mesh protective layer 1010. In this example, the mesh protective layer 1010 may be polyester monofilament or any suitable material. The protected microphone system 1000 includes a microphone 1020, a PCB 1030, and a housing 1040. The PCB 1030 may be flexible or rigid, and is electrically coupled to the microphone 1020. In this example, the PCB 1030 is coupled to the housing 1040. The PCB 1030 includes a port P1 to allow sound to travel to the microphone 1020.

The housing 1040 includes a port P2 to allow sound to travel into the protected microphone system 1000. In this example, the mesh protective layer 1010 is adhered to the housing 1040 and the PCB 1030 using support structures 1050. The mesh protective layer 1010 includes an active area 1060. The active area 1060, along with a portion of the housing 1040 and a portion of the support structures 1050 form a cavity 1070 within the protected microphone system 1000. The active area 1060, along with a portion of the PCB 1030 and a portion of the support structures 1050 form a cavity 1090 within the protective microphone system 1000. As shown in FIG. 10, the cavity 1070 and the cavity 1090 are separated by the active area 1060 of the mesh protective layer 1010. In this example, a first velocity (V1) represents the motion of the housing 1040, the PCB 1030, and the support structure 1050, and a second velocity (V2) represents the motion of the active area 1060.

V2 may vary based on the stiffness of the mesh protective layer 1010, the mass of the mesh protective layer 1010, the acoustic resistance of the mesh protective layer 1010, or a combination of any of the above. In this example, an acoustic resistance of the mesh protective layer 1010 of below 700 Rayls (kg/sm$^2$) produced a minimal impact on the acoustic sensitivity and low vibration sensitivity. Unexpectedly, the system without dampening material yields the lowest vibration sensitivity relative to acoustic sensitivity. The mesh protective layer 1010 may have a stiffness of over approximately 1×10$^6$ N/m and may have a low vibration sensitivity. These parameters, for example mesh stiffness, mass, and acoustic resistance, may each vary with the dimensions of cavity 1070, cavity 1090, P1, and P2.

In the examples described herein, the microphone may be stiffly coupled to the membrane support material or the mesh support material. If a dampener is present, the dampener will vibrate separately from the other components of the image capture device, causing pressure fluctuations in a volume directly in front of the microphone. These pressure fluctuations may be detected by the microphone as an acoustic signal.

A volume between the microphone and the membrane material or the mesh material may be kept to a minimum to promote direct coupling between the motion of the membrane material or the mesh material and a membrane of the microphone. If a non-air permeable membrane is used, the stiffness of the material may be kept as low as possible. In addition, the mass of the membrane material or the mesh material may be kept as low as possible. For example, as the mass of the membrane material or the mesh material decreases, the relative level of acoustic energy to vibration energy may increase. In an example where the membrane support material is not rigidly coupled to the microphone, increasing the membrane material may cause a drop in acoustic sensitivity. In addition, the motion between the housing, the membrane material or the mesh material, and the microphone may decrease as the mass of the membrane material and the mesh material decreases.

A port through the image capture device housing to an external environment may be short in a thickness direction with a large diameter. In an example where the mounting between the housing and the mesh material or the membrane material is not stiff, a port that is short in a thickness direction with a large diameter may allow pressure fluctuations from any relative motion between the image capture device housing and the membrane material or the mesh material to be relieved by the port. In this example, the vibrations sensitivity at low to mid frequencies may be reduced.

If an open, air permeable mesh is present, the acoustic resistance may be kept as low as possible. For example, as the acoustic resistance increases, acoustic sensitivity is reduced to an asymptote defined by where the vibration of the mesh material becomes dominant over the path through the acoustic resistor. In addition, as the acoustic resistance increases, vibration sensitivity is increased to an asymptote defined by where vibration of the mesh is dominant, for example when it is easier to move the mesh than interchange air between the image capture device housing and mesh and the volume between the mesh and the microphone.

If an open, air permeable mesh is present, increasing the mesh stiffness may decrease vibration sensitivity. Acoustic sensitivity may not be affected by varying the mesh or dampener stiffness.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the terms "image capture device," "imaging device," and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An image capture device comprising:
a housing that includes a first port that is fluidly connected to a first cavity of the image capture device and an external environment relative to the image capture device;
an audio capture device configured to obtain an audible sound;
a printed circuit board (PCB) electrically coupled to the audio capture device, wherein the PCB includes a second port that is fluidly connected to a second cavity and the audio capture device;
a protective layer that separates the first cavity and the second cavity, wherein the first cavity is defined by a portion of the housing and a portion of the protective layer, and wherein the second cavity is defined by a portion of the PCB and the portion of the protective layer; and
a support structure that is in contact with an edge portion of the protective layer and configured to provide structural support to the protective layer.

2. The image capture device of claim 1, wherein the PCB is directly coupled to the housing.

3. The image capture device of claim 1, wherein the support structure is adhered to a portion of the PCB and a portion of the housing.

4. The image capture device of claim 1, wherein the protective layer is a mesh.

5. The image capture device of claim 4, wherein the mesh is a polyester monofilament.

6. The image capture device of claim 4, wherein the mesh has an acoustic resistance below 700 Rayls.

7. The image capture device of claim 4, wherein the mesh has a stiffness of above $1 \times 10^6$ N/m.

8. The image capture device of claim 1, wherein the protective layer is a membrane.

9. The image capture device of claim 8, wherein the membrane is a silicone material or a polytetrafluoroethylene (PTFE) material.

10. The image capture device of claim 8, wherein the membrane is air permeable or non-air permeable.

11. An image capture device comprising:
a housing that includes a first port that is fluidly connected to a first cavity of the image capture device and an external environment relative to the image capture device;
an audio capture device configured to obtain an audible sound;
a printed circuit board (PCB) electrically coupled to the audio capture device, wherein the PCB includes a second port that is fluidly connected to a second cavity and the audio capture device;
a dampener coupled to the PCB and the housing;
a protective layer that separates the first cavity and the second cavity, wherein the first cavity is defined by a portion of the housing and a portion of the protective layer, and wherein the second cavity is defined by a portion of the PCB and the portion of the protective layer; and
a support structure that is in contact with an edge portion of the protective layer and configured to provide structural support to the protective layer.

12. The image capture device of claim 11, wherein a portion of the dampener is coupled to the housing.

13. The image capture device of claim 11, wherein the support structure is adhered to a portion of the dampener and a portion of the PCB.

14. The image capture device of claim 11, wherein the dampener is a foam material or a thin metal.

15. The image capture device of claim 11, wherein the protective layer is a mesh.

16. The image capture device of claim 15, wherein the mesh is a polyester monofilament.

17. The image capture device of claim 15, wherein the mesh has an acoustic resistance below 700 Rayls.

18. The image capture device of claim 15, wherein the mesh has a stiffness of above $1\times10^6$ N/m.

19. The image capture device of claim 11, wherein the protective layer is a membrane.

20. The image capture device of claim 19, wherein the membrane is a silicone material or a polytetrafluoroethylene (PTFE) material.

* * * * *